(12) United States Patent
Yamamoto et al.

(10) Patent No.: US 6,924,616 B2
(45) Date of Patent: Aug. 2, 2005

(54) ROTATIONAL DRIVING APPARATUS

(75) Inventors: Akinori Yamamoto, Kosai (JP); Junichi Hasegawa, Kariya (JP)

(73) Assignees: Asmo Co., Ltd., Shizuoka-pref. (JP); Denso Corporation, Kariya (JP)

( * ) Notice: Subject to any disclaimer, the term of this patent is extended or adjusted under 35 U.S.C. 154(b) by 0 days.

(21) Appl. No.: 10/827,247

(22) Filed: Apr. 20, 2004

(65) Prior Publication Data

US 2004/0212341 A1 Oct. 28, 2004

(30) Foreign Application Priority Data

Apr. 24, 2003 (JP) ........................................ 2003-120479
Feb. 9, 2004 (JP) ........................................ 2004-032715

(51) Int. Cl.$^7$ ............................................... G05B 19/40
(52) U.S. Cl. ........................................ 318/685; 318/696
(58) Field of Search ................................ 318/685, 696, 318/560, 635, 650, 805, 442, 504

(56) References Cited

U.S. PATENT DOCUMENTS

| | | | |
|---|---|---|---|
| 2002/0064051 A1 | | 5/2002 | Sugimoto et al. |
| 2003/0068181 A1 | * | 4/2003 | Miyata et al. ............... 399/394 |
| 2003/0076080 A1 | * | 4/2003 | Le ............................... 323/312 |

* cited by examiner

Primary Examiner—Karen Masih
(74) Attorney, Agent, or Firm—Posz Law Group, PLC

(57) ABSTRACT

It is an object of the present invention to provide a rotational driving apparatus for a motor vehicle, which moves optical axis of headlights in response to a steering angle of a steering wheel, and which can accurately determine that an output shaft is in good operational order, while accepting errors inevitably taking place. According to the present invention, it is determined that the output shaft of the rotational driving apparatus is operating in a good order, when a first and a second detected voltage at a first and a second detection position are within a predetermined error range and when a deferential voltage between the first and second detected voltages is within a certain deferential voltage span.

12 Claims, 7 Drawing Sheets

ROTATIONAL DRIVING APPARATUS

CROSS REFERENCE TO RELATED APPLICATION

This application is based on Japanese Patent Application Nos. 2003-120479 filed on Apr. 24, 2003 and 2004-032715 filed on Feb. 9, 2004, the disclosures of which are incorporated herein by reference.

FIELD OF THE INVENTION

The present invention relates to a rotational driving apparatus, in particular, to such an apparatus for moving an optical axis of headlights of a motor vehicle so that a direction of irradiation of the headlights will be controlled in accordance with a steering angle of a steering wheel.

BACKGROUND OF THE INVENTION

In a prior art apparatus for controlling the direction of irradiation of the headlights, a brushless motor is used as a driving force for moving the direction of the irradiation, wherein an output shaft of the apparatus operatively connected to the headlights is connected to the brushless motor over a speed reduction mechanism.

In such a prior art apparatus using the brushless motor, it is, however, disadvantageous in that a position sensor for detecting rotational positions of the motor is necessary and therefore such apparatus is high in its manufacturing cost and more complicated in its structure. Furthermore, when a potentiometer is used as the position sensor, the detection of the position is less accurate and less reliable because the position of the motor shaft is detected by its contact resistance. It is accordingly proposed in the prior art that a stepping motor, a rotational position of which is controlled by a number of stepping pulses, is used instead of the brushless motor as the driving force for the headlights.

Even in the case that the stepping motor is used, detected positions of the motor inevitably include detection errors due to various causes. For example, in a case that a magnetic sensor is used for detecting the rotational positions of an output shaft of the apparatus, the detected positions include errors caused by the variations of magnetic fluxes of permanent magnets when the temperature changes. Furthermore, the detected positions may include errors caused by stopping deviation, errors caused by abrasion in response to its number of use, and errors caused by bounds at impingement of the output shaft during an initialization process.

As above, the detected positions have a certain range, during which the detected amount from the sensor would not be changed even when the output shaft of the apparatus is rotated. Therefore, it may not be possible in some cases that the rotational positions of the output shaft will be accurately detected. For example, in case that the stepping motor is out of order due to a disconnection of an electric power line or operated with lost motion, the output shaft will not be rotated in proportion to the stepping pulses. Since the detected voltage from sensors has a certain range during which the detected voltage remains unchanged, it may not be possible in some cases whether the stepping motor is in a good operational order or not when the motor should be rotated within a small rotational angle.

SUMMARY OF THE INVENTION

It is, therefore, an object of the present invention, in view of the above mentioned problems, to provide a rotational driving apparatus which can accurately determine that an output shaft is in good operational order, while accepting errors inevitably taking place.

According to the present invention, it is determined that the output shaft of the rotational driving apparatus is operating in a good order, when a first and a second detected voltage at a first and a second detection position are within a predetermined error range and when a deferential voltage between the first and second detected voltages is within a certain deferential voltage span.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS

A rotational driving apparatus for a motor vehicle according to the present invention will be now explained with reference to the drawings.

Figure 1:
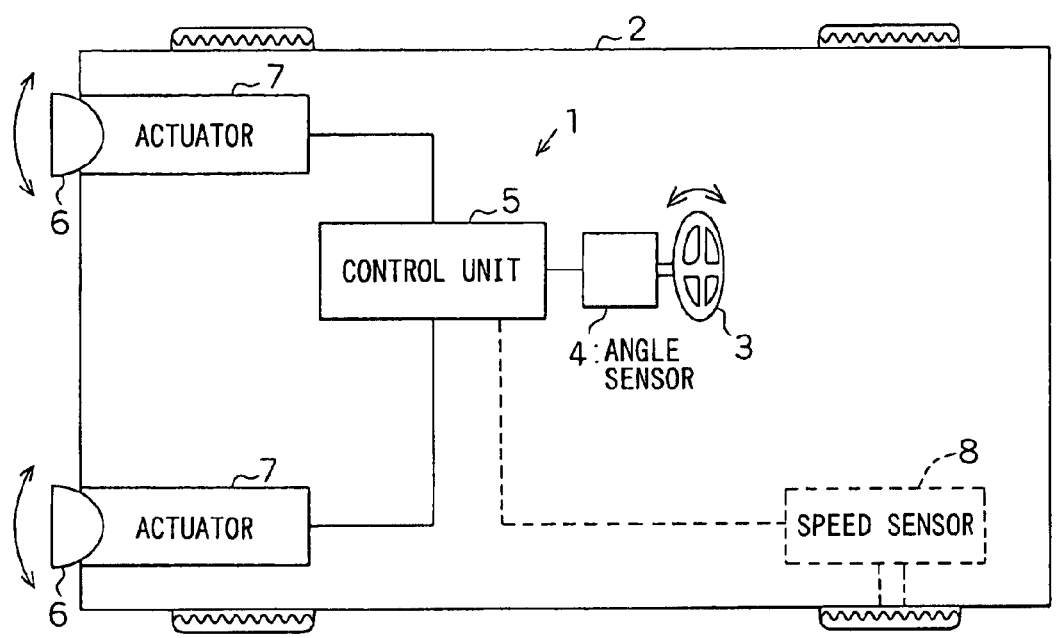
FIG. 1 is a schematic view showing a rotational driving apparatus installed in a motor vehicle.

As shown in FIG. 1, a rotational driving apparatus 1 comprises an actuator 7 pivotally moving a pair of headlights 6 provided at front side ends of a motor vehicle 2 and a control unit 5 for controlling the actuator 7. The control unit 5 is connected to an angle sensor 4 which detects a rotational amount of a steering wheel 3, so that the control unit 5 controls the actuator 7 in accordance with an output voltage from the angle sensor 4, which corresponds to a steering angle of the steering wheel 3.

Figure 2:
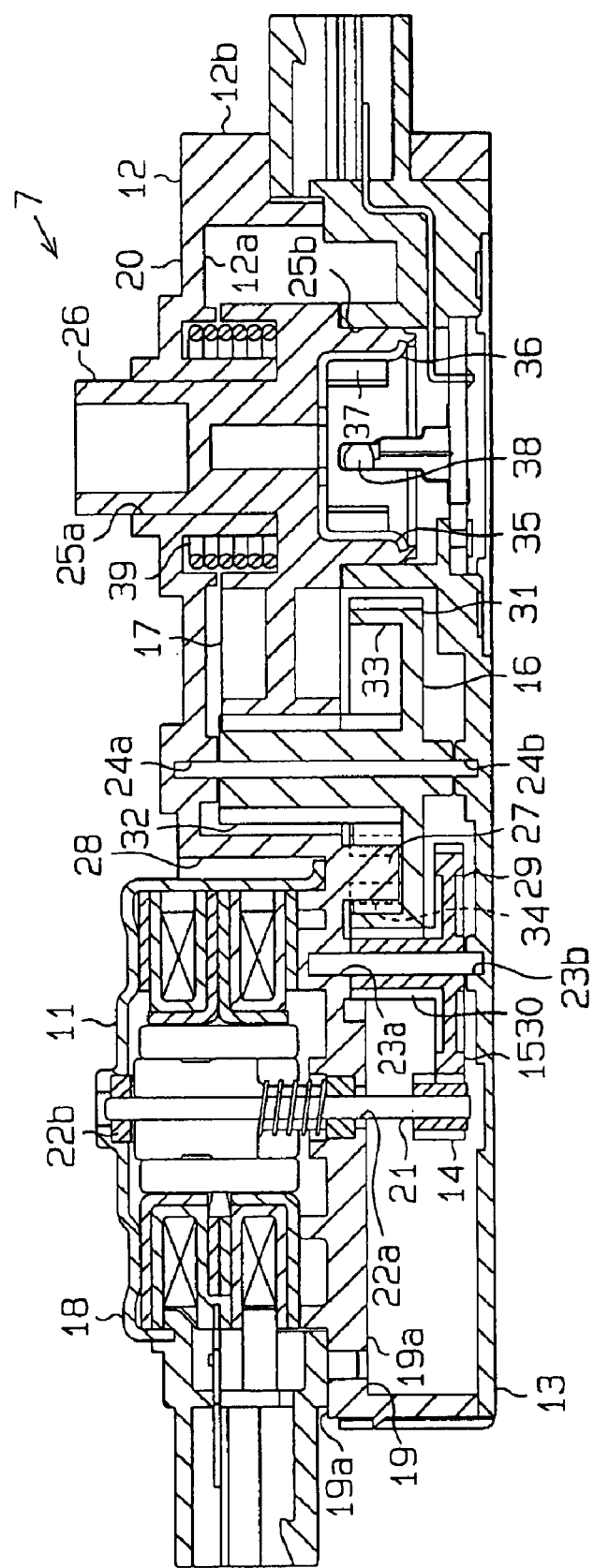
FIG. 2 is a cross-sectional view showing an actuator according to an embodiment of the present invention.

As shown in FIG. 2, the actuator 7 has a first housing 12 and a second housing 13, in which a driving gear 14, a first intermediate gear 15, a second intermediate gear 16 and an output gear 17 are disposed. A stepping motor 18 is attached to an outside of the first housing 12.

Figure 4:
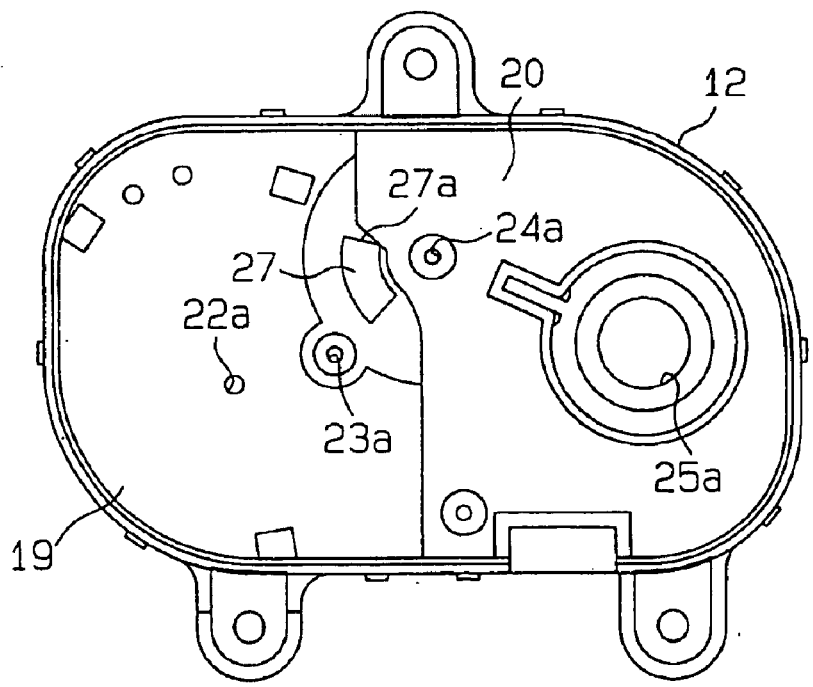
FIG. 4 is a front view showing a first housing of the present invention.

The first housing 12 has an almost rectangular bottom 12a and a wall 12b surrounding the bottom 12a and extending in a perpendicular direction to the bottom 12a. The second housing 13 of a flat shape is attached to the wall 12b. The bottom 12a has two bottom portions. One of them is a shallow bottom portion 19 and the other is a deep bottom portion 20, wherein a length between the second housing 13 and the shallow bottom portion 19 is smaller than that between the second housing 13 and the deep bottom portion 20, as shown in FIGS. 2 and 4, wherein FIG. 4 is a front view showing the first housing 12 when viewed from the second housing 13.

A first upper bearing 22a is fixed to the shallow bottom portion 19 and a motor bearing 22b is fixed to a bottom of a cup-shaped motor casing 11, wherein a rotational shaft 21 of the stepping motor 18 is rotationally supported by those bearings 22a and 22b. A second upper bearing 23a is provided at an inner surface 19a of the shallow bottom portion 19 and a second lower bearing 23b is formed at an inner surface of the second housing 13, so that the first intermediate gear 15 is rotationally supported by the bearings 23a and 23b. A third upper bearing 24a is provided at an inner surface of the deep bottom portion 20 and a third lower bearing 24b is formed at the inner surface of the second housing 13, so that the second intermediate gear 16 is rotationally supported by the bearings 24a and 24b.

Figure 3:
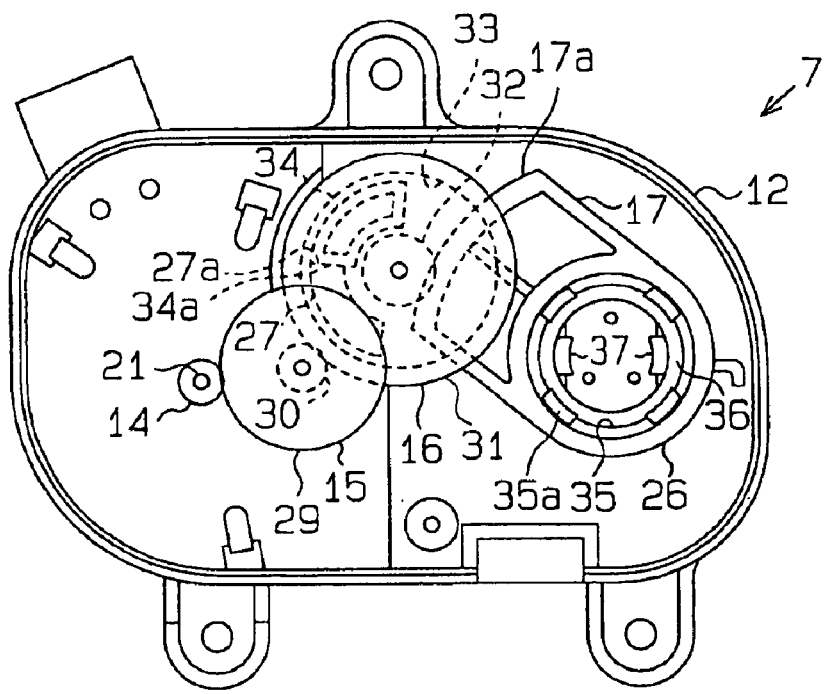
FIG. 3 is a front view showing an inside of the actuator.

A fourth upper bearing 25a is provided at the deep bottom portion 20 and a fourth lower bearing 25b is formed at the second housing 13, so that an output shaft 26 is rotationally supported by the bearings 25a and 25b. A stopper 27 extending towards the second housing 13 is formed at the shallow bottom portion 19. As shown in FIGS. 3 and 4, the stopper 27 has an arc shape, a center of which coincides with a center of the third upper bearing 24a, and is formed with a flat surface portion 27a at the circumferential ends. The stopper 27 is formed at a position, which is an opposite side of and adjacent to a wall 28 between the shallow and deep bottom portions.

The stepping motor 18 is attached to an outer surface 19b of the shallow bottom portion 19. The rotational shaft 21 of the stepping motor 18 is rotated within a predetermined angle range in accordance with a control pulse signal from the control unit 5 (FIG. 1). In this embodiment, the angle sensor 4 connected to the steering wheel 3 of the motor vehicle 2 detects an amount of the rotation of the steering wheel 3 (which is the steering angle) and transmits the amount to the control unit 5. The control unit 5 then outputs the control pulse signal to the stepping motor 18 in accordance with the above amount, so that the rotational shaft 21 will be rotated by a desired rotational angle. Thus, a direction of the motor vehicle 2 as well as a direction of the irradiation of the headlights 6 is controlled in response to the rotation of the steering wheel 3, so that the direction of the movement of the motor vehicle 2 will be irradiated by the headlights 6.

The headlight 6 on the right-hand side of the motor vehicle 2 is so adjusted that an optical axis will be moved from its reference position to the right by 15 degrees at the maximum, while the optical axis of the headlight 6 on the left-hand side will be moved from its reference position to the left by 5 degrees at the maximum. And in this embodiment, a forward direction means a direction of the movement of the optical axis from its reference positions to the right and left direction, respectively.

The rotational shaft 21 of the stepping motor 18 is rotationally supported by the bearings 22a and 22b and the driving gear 14 rotated by the shaft 21 is provided at a forward end of the rotational shaft 21.

The first intermediate gear 15 is rotationally supported by the bearings 23a and 23b and has a large gear 29 and a small gear 30, wherein the large gear 29 is engaged with the driving gear 14.

The second intermediate gear 16 is rotationally supported by the bearings 24a and 24b and likewise has a large gear 31 and a small gear 32, wherein the large gear 31 is engaged with the small gear 30 of the first intermediate gear 15.

As shown in FIGS. 2 and 3, a circular concave 33 is formed in an upper surface of the large gear 31 of the second intermediate gear 16. A limiter 34 is formed in the circular concave 33, wherein the limiter 34 has an arc shape, a center of which coincides with a center of the second intermediate gear 16, and extends from the bottom of the circular concave 33 towards the first housing 12. A flat surface portion 34a is formed at both of the circumferential ends.

As shown in FIG. 2, the circular concave 33 of the second intermediate gear 16 faces to the bottom 12a of the first housing 12, wherein the second intermediate gear 16 is rotationally supported by the bearings 24a and 24b. The stopper 27 formed on the shallow bottom portion 19 is protruding into the circular concave 33, so that when the second intermediate gear 16 is rotated in either of forward or backward direction, the flat surface portion 34a will be contacted with the flat surface portion 27a of the stopper 27.

The stopper 27 has the arc shape corresponding to the circular shape of the concave 33 and protrudes into the concave 33 so that the stopper will contact with the limiter 34a in the circumferential direction when the second intermediate gear 16 is rotated in either direction. A width of the stopper 27 from its inner diameter end to its outer diameter end is made smaller than a width of the concave 33 from its inner diameter end to its outer diameter end, so that the second intermediate gear 16 can be rotated, receiving the stopper 27 in the concave 33, until the limiter 34 will contact with the stopper in the circumferential direction.

The output shaft 26 is rotationally supported by the bearings 25a and 25b and is formed with an output gear 17. An output gear portion 17a of an arc shape is formed at an outer periphery of the output gear 17 and is engaged with the small gear 32 of the second intermediate gear 16.

Accordingly, the rotation of the output shaft 26 is possible until the limiter 34 of the second intermediate gear 16 will contact the stopper 27. As above, the rotational movement of the output shaft 26 is limited within a certain angular range, and a stopping means for the output shaft is constituted by the limiter 34 and the stopper 27 in the embodiment.

The output shaft 26 protrudes from the first housing 12 and its one end is operatively connected to the headlights 6.

At the other end of the output shaft 26, a cylindrical concave 35 is formed to which a cylindrical ring 36 is attached by adhesive material.

A pair of permanent magnets 37 opposing to each other is fixed to an inner surface of the cylindrical ring 26. A magnetic sensor 38, which is a sensor for detecting a rotational position of the output shaft 26, is attached to the second housing 13 and disposed inside of and at the center of the cylindrical ring 26. The magnetic sensor 38 detects magnetic flux density generated at the magnets 37 and outputs a signal in proportion to change of the magnetic flux density caused by the rotation of the output shaft 26. Accordingly, the position of the output gear 17, namely the direction of the irradiation of the head lights 6 can be detected.

A torsion spring 39 is interposed in a ring space formed at the first housing 12 and one end of the spring 39 is connected to the first housing 12 while the other end is connected to the output shaft 26 (or the output gear 17), so that the output shaft 26 is urged in a reverse direction. Accordingly, the output shaft 26 is firmly held by the housing 12 and an error caused by the output shaft 26 can be suppressed, in particular, the suppression of the error is effective when the rotational driving apparatus 1 is subject to vibration.

Figure 5:
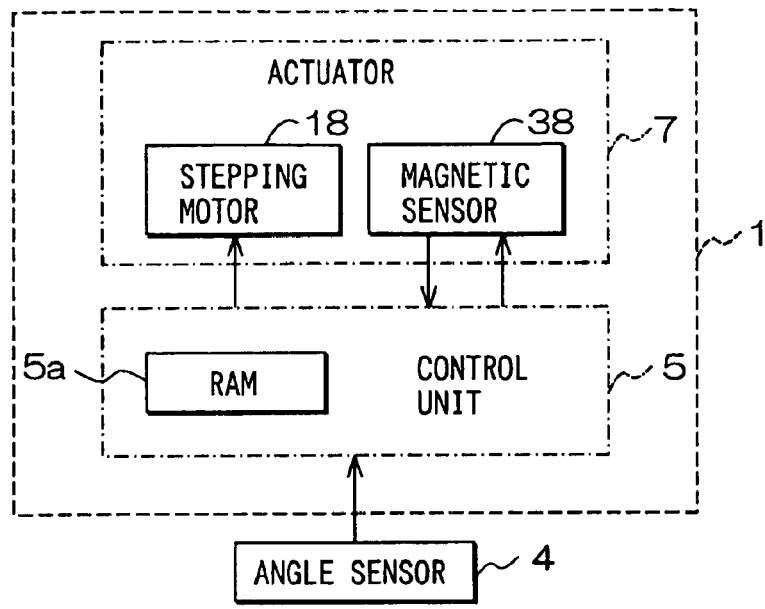
FIG. 5 is a block diagram showing the rotational driving apparatus of the present invention.

As shown in FIG. 5, the control unit 5 is connected to the magnetic sensor 38 provided in the actuator 7. The control unit 5 corresponds to a position detecting means for detecting a rotational position of the output shaft 26 based on the signal (detected voltage) of the magnetic sensor 38. The control unit 5 further supplies electric power to the magnetic sensor 38. The control unit 5 is provided with RAM (Random Access Memory) Sa as a memory means, which memorizes the detected voltage from the magnetic sensor 38 and a number of steps of the stepping motor 18. The detected voltage from the magnetic sensor 38 will be updated whenever the value of the detected voltage changes.

Figure 8:
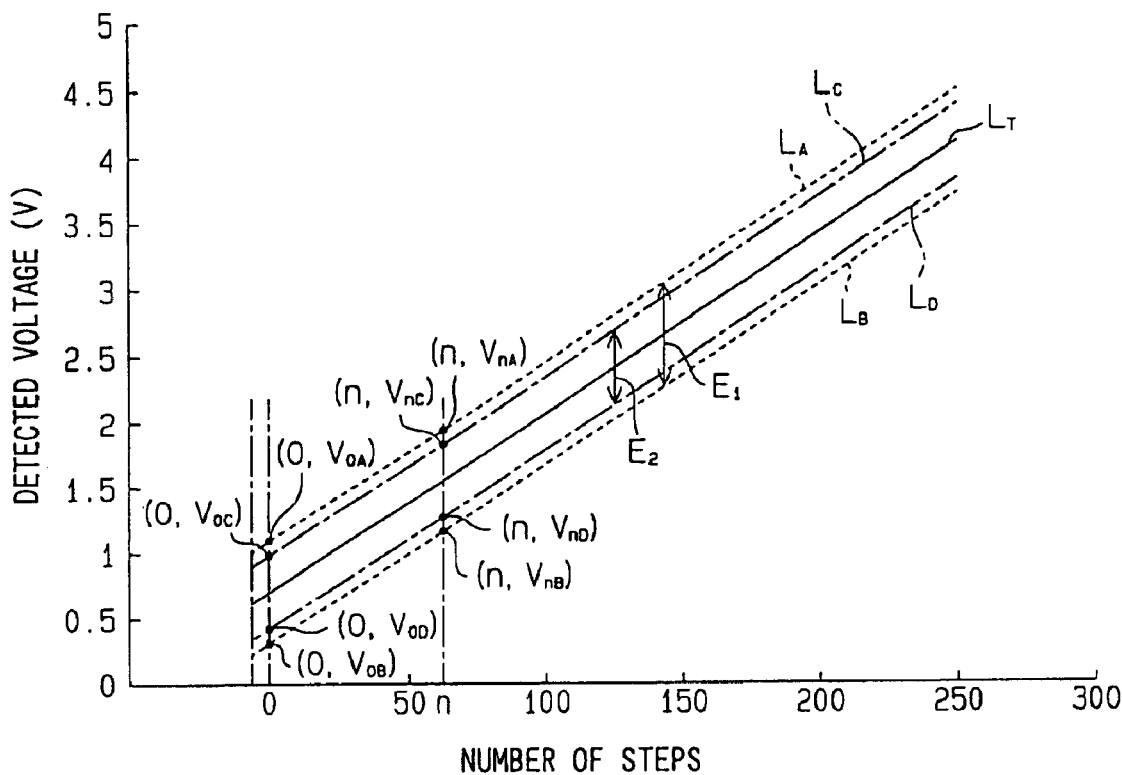
FIG. 8 is a graph showing a relation between a detected voltage and a number of steps for an output shaft.

As shown in a graph of FIG. 8, an output voltage from the magnetic sensor 38 corresponding to each rotational position of the output shaft 26 is in advance memorized in the control unit 5, as indicated by a reference line $L_T$. The rotational position of the output shaft 26 is converted into corresponding number of steps and such number of steps is memorized in the control unit 5, wherein one step corresponds to 0.1 degree. The control unit 5 detects a rotational position of the output shaft 26 from a detected voltage from the magnetic sensor 38 with reference to this line $L_T$. Then the control unit 5 drives the stepping motor 18 of the actuator 7 in response to the rotational position of the output shaft 26, to rotate the same. In the following description, the control unit 5 controls the stepping motor 18 in accordance with the graph shown in FIG. 8.

The detected voltage from the magnetic sensor 38 fluctuates in a first error range $E_1$ and a second error range $E_2$ with reference to the reference line $L_T$.

The first error range $E_1$ is a range of errors to be caused at the output shaft 26, wherein the maximum values thereof are indicated by a line $L_A$, while the minimum values are indicated by a line $L_B$. The first error range $E_1$ corresponds to errors in relation to position detection of the output shaft 26. For example, such errors include errors in detected voltage from the magnetic sensor 38 caused by temperature variation, errors of the output shaft 26 caused by stopping deviation, errors of the output shaft 26 caused by saccadic movement due to the vibration of the motor vehicle 2, errors of the output shaft 26 caused by abrasion in response to its number of use, and errors of the output shaft 26 caused by bounds at impingement of the output shaft 26 against the stopper means (contact or impingement of the limiter 34 against the stopper 27).

The second error range E2 is made to be narrower than the first error range $E_1$, wherein the maximum values thereof are indicated by a line $L_C$, while the minimum values are indicated by a line $L_D$. The second error range $E_2$ corresponds to errors to be caused in relation to the rotation of the output shaft 26. For example, such errors include errors of the output shaft 26 caused by stopping deviation, errors of the output shaft 26 caused by saccadic movement due to the vibration of the motor vehicle 2, and errors of the output shaft 26 caused by abrasion in response to its number of use. Namely, the errors in detected voltage caused by temperature variation and the errors of the output shaft 26 caused by bounds at the impingement of the shaft 26 are excluded, when compared with the first error range $E_1$, because the temperature variation of the rotational driving apparatus 1 can be neglected at a certain rotational timing and because the bounds may not occur during a normal rotation of the shaft 26. Accordingly, when the second error range $E_2$ is used for the operation, the rotational position and the operation in a good order can be more accurately detected.

As shown in FIG. 1, the control unit 5 is further connected to the angle sensor 4 attached to the steering wheel 3. The angle sensor 4 outputs a steering signal in proportion to a steering angle of the steering wheel 3. The control unit 5 drives the actuator 7 in accordance with the steering signal and controls the position of the optical axis of the headlights 6 operatively connected to the output shaft 26.

The control unit 5 also operates as a determination means for determining based on the detected voltage from the magnetic sensor 38 whether the output shaft 26 is in a good order. For example, the control unit 5 determines whether a first detected voltage of the output shaft 26 at a first detection position as well as a second detected voltage of the output shaft 26 at a second detection position, at which the output shaft 26 has been rotated by driving the stepping motor 18 by a predetermined number of pulses, is within the first error range $E_1$. Then the control unit 5 further determines whether a deferential voltage between the first and second detected voltages is within a predetermined span of the deferential voltage, wherein the first and second detection positions are differentiated by the predetermined number of stepping pulses for the stepping motor 18. And the control unit 5 determines that the output shaft 26 is in the good order, when the first and second detected voltages are within the first error range $E_1$ and the deferential voltage between the first and second detected voltages is also within the predetermined span of the deferential voltage.

More exactly, the control unit 5 determines that the output shaft 26 has been rotated without causing an immovable condition or a lost motion, when the deferential voltage between the first and second detected voltages is within a span of a first and a second deferential voltage. Here, the first deferential voltage means a deferential voltage between the maximum value ($V_{OC}$) of the second error range $E_2$ at the first detection position and the minimum value ($V_{ND}$) of the second error range $E_2$ at the second detection position, while the second deferential voltage means a deferential voltage between the minimum value ($V_{OD}$) of the second error range $E_2$ at the first detection position and the maximum value ($V_{NC}$) of the second error range $E_2$ at the second detection position, as shown in FIG. 8.

When an initialization of the output shaft 26 is necessary, the control unit 5 drives at first the output shaft 26 to rotate in a reverse direction until one of the circumferential flat surface 34a of the limiter 34 will contact the stopper 27 and then to rotate the same in the forward direction by the predetermined number of the stepping pulses until the output shaft 26 reaches at a reference position (an initializing operation). As a result of this operation, the output shaft 26 will be always and accurately positioned at its reference position. In this operation, the control unit 5 operates as a means for initializing the position of the output shaft.

In this case, the first detection position is an original position of the output shaft 26 before the initializing operation, and the second detection position is a position of the output shaft 26 which has been rotated to the reference position (after the initializing operation). The control unit 5 determines whether the deferential voltage between the first and second detected voltages is within a third error range, wherein the third error range is an error range of the output shaft 26 including errors caused by bounds which may occur when the limiter 34 will contact the stopper 27. The control unit 5 determines that the output shaft 26 is correctly positioned at its reference position when the deferential voltage is within the third error range.

In other words, when the output shaft 26 is positioned at its reference position or adjacent to the reference position, the deferential voltage between the first and second detected voltages shall become within the third error range at the initializing operation. Accordingly, through the determination whether the deferential voltage between the first detected voltage before the initializing operation and the second detected voltage after the initializing operation is within the third error range which includes errors caused by the bounds, the control unit 5 can determine whether the output shaft 26 is positioned at its reference position while accepting the errors caused by the bounds.

The control unit 5 determines that the output shaft 26 is not positioned at its reference position when the deferential voltage is not within the third error range. In this case, the control unit 5 drives the output shaft 26 to rotate the same in the reverse direction from then position (the position after the initializing operation) to a contact position where the limiter 34 contacts the stopper 37 (this contact position is also referred to, in this specification, as the impingement position of the output shaft), and then to rotate the same in the forward direction to the reference position (return initializing operation). In this operation, the control unit 5 operates as a means for returning the output shaft 26 to its reference position.

When the output shaft 26 is rotated in the reverse direction from its initial (original) position to the contact position (the impingement position) in the initializing operation, an angle for the rotation of the output shaft 26 shall be made larger than an angle, which is an additional value of an angle between the reference position and the contact position and an angle corresponding to the third error range. Then, in case that the output shaft 26 is not positioned at its reference position, it is determined by the control unit that the initial position (the first detection position) is different from the position after the rotation (the second detection position) and the return initializing operation will be proceeded.

It is accordingly confirmed that the output shaft 26 is positioned at its reference position after the output shaft 26 is rotated in the reverse direction by the bare minimum number of pulses in the initializing operation. The return initializing operation will be carried out only when the output shaft 26 is not positioned at its reference position. In this way, the number of impingement (impingement between the limiter and the stopper) of the output shaft 26 can be minimized, whether the output shaft 26 is positioned at its reference position or not.

If the control unit 5 proceeded with the return initializing operation every time, the output shaft 26 will be always positioned to its reference position without a process for determining where the original or initial position of the output shaft 26 is. It is, however, not preferable because a number of impingement between the limiter 34 and the stopper 27 will be increased and thus durability of the stepping motor 18 and gears (the first and second intermediate gears 15 and 16) will be decreased and a longer time will be necessary for initializing the position of the output shaft 26. The output shaft 26 is in many cases positioned at its reference position before starting the operation of the rotational driving apparatus, and therefore, if the initializing operation and/or the return initializing operation will be done every time from such original (initial) position, the number of impingement (wherein the limiter 34 impinges against the stopper 27) will unnecessarily become higher depending on the ranges of errors. On the other hand, according to the present invention, the output shaft 26 is rotated at first in the initializing operation and it is detected and determined whether the output shaft 26 is in a good order or not, and only when the output shaft 26 is not in the good order the return initializing operation will take place.

Accordingly, the number of impingement (between the limiter 34 and the stopper 27) according to the present invention will be smaller than that of the cases in which the return initializing operation will be done every time.

Figure 9:
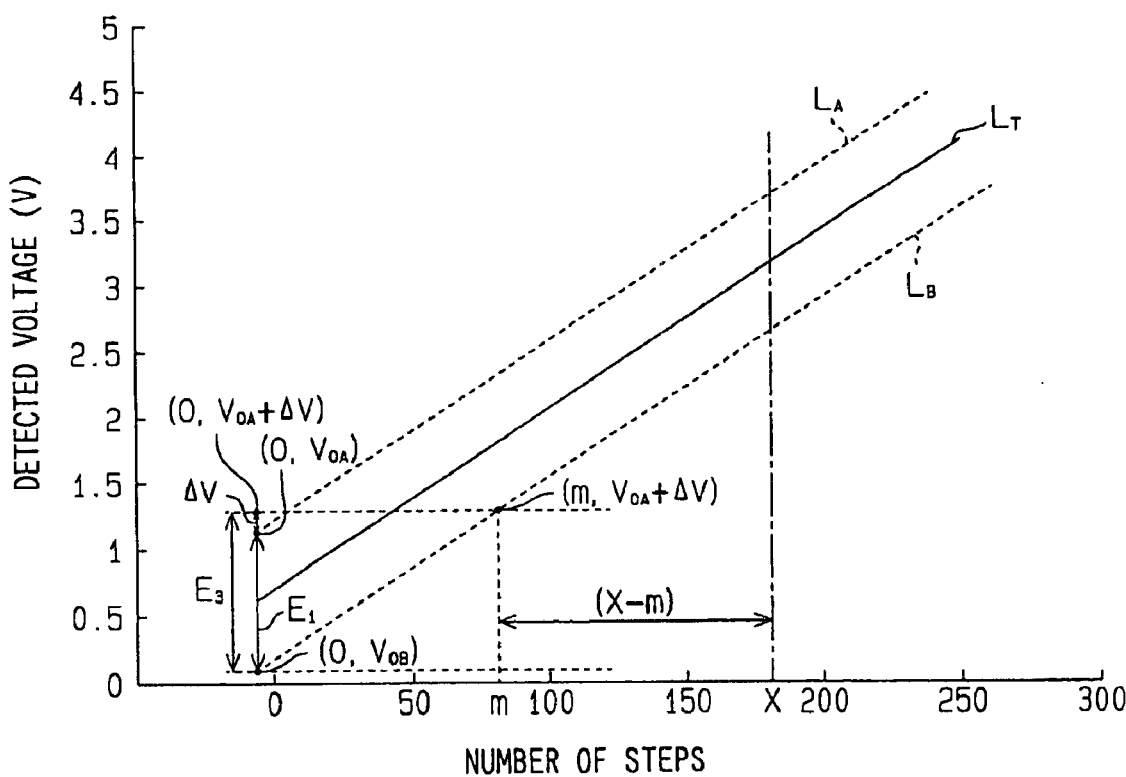
FIG. 9 is another graph showing a relation between a detected voltage of a magnetic sensor and a number of steps for an output shaft.

If the deferential voltage between the first and second detected voltages is not within the third error range, and thereby it is determined that the output shaft 26 is not positioned at its reference position, then it will be further detected whether the detected voltage of the output shaft 26 is within a reference position range E3 in FIG. 9. The reference position range E3 is such a range, within which errors to be caused by the bounds taking place when the limiter 34 impinges against the stopper 27 is suppressed by rotating the output shaft 26 in the reverse direction at a lower speed.

When the detected voltage of the output shaft 26 is determined that the output shaft 26 is out of the reference position range $E_3$, the control unit 5 calculates a necessary number of stepping pulses (a necessary rotational amount for the stepping motor) for driving the output shaft 26 to rotate the same until the detected voltage will become within the reference position range $E_3$, wherein the output shaft 26 will be rotated in the reverse direction by such rotational amount at a first rotational speed $V_f$, and then the output shaft 26 will be further rotated in the same direction at a second rotational speed $V_s$ which is lower than the first speed Vf. The second rotational speed $V_s$ is so selected to be a relatively low speed that errors of the detected voltage caused by the bounds at the impingement between the limiter 34 and the stopper 27 can be suppressed in the return initializing operation. On the other hand, the output shaft 26 is rotated at the first rotational speed $V_f$ when the position of the output shaft 26 is so far from the reference position and thereby the bounds to be caused at the impingement between the limiter 34 and the stopper 27 in the return initializing operation may not be taken into consideration. Namely, when the position of the output shaft 26 is so close to the reference position that the influence by the bounds should be taken into consideration, then the output shaft 26 will be rotated at the second rotational speed $V_s$.

The control unit 5 controls the rotational speed of the output shaft 26, so that it is rotated at the rotational speed $V_s$ only when the detected voltage of the output shaft 26 is within the reference position range, and that the output shaft 26 will be rotated at a speed $V_{st}$ which is higher than the second speed $V_s$ but lower than the first speed $V_f$ in case that the output shaft 26 shall be rotated at a speed other than the first and second speeds $V_f$ and $V_s$.

When the control unit 5 will drive the output shaft 26 to rotate it at the first rotational speed $V_f$, the control unit 5 will increase the electric current and voltage to be applied to the stepping motor 18 in proportion to the increase of the rotational speed, to avoid a stepping out of the motor 18.

The above reference position range $E_3$ is a range in which a predetermined voltage $\Delta V$ is added to the first error range $E_1$ (the range from the maximum value line $L_A$ to the minimum value line $L_B$) at the reference position (the number of step is zero). The voltage $\Delta V$ is a value accepting errors of the detected voltage to be caused at the change of the rotational speed from the first speed $V_f$ to the second speed $V_s$ due to its inertia of the output shaft 26.

The above necessary number of stepping pulses for driving the stepping motor 18 (and the output shaft 26) so that the detected voltage will become within the reference position range $E_3$ will be calculated as a number of steps, by which the stepping motor 18 is rotated so that the first error range $E_1$ corresponding to the detected voltage of the output shaft 26 will become within the reference position range $E_3$. In other words, it will be the number of steps so that the minimum value (the line $L_B$) of the first error range $E_1$ will become smaller than the maximum value of the reference position range $E_3$ after the output shaft 26 has been rotated by an angle corresponding to the number of stepping pulses.

This operation will be explained more in detail with reference to the graph in FIG. 9. The control unit 5 calculates at first a coordinate (m, $V_{OA}+\Delta V$) of a point where the maximum value of the reference position range E3 (=$V_{OA}+\Delta V$) crosses the line $L_B$. Then, in case that it is detected from the detected voltage from the magnetic sensor 38 that the output shaft 26 is positioned at a point X, which corresponds to a position far from the reference position by X steps, the control unit 5 calculates the necessary number of stepping pulses (X−m) for the stepping motor 18 so that when the stepping motor 18 is rotated by the stepping pulses of this number (X−m) the minimum value (the line $L_B$) of the detected voltage from the magnetic sensor 38 will become in the first error range $E_1$. In this calculation, when the number of steps (X) is larger than the number of steps (m), it is determined that the detected voltage is out of the reference position range $E_3$, and vise versa.

In this case, namely when the output shaft 26 is positioned at the point X, and if the output shaft 26 were rotated at the second rotational speed $V_s$ to move the position of the output shaft 26 from the point X to the reference position, the required time for the movement would be $X/V_s$ (1). On the other hand, when the output shaft 26 is rotated at the first rotational speed $V_f$ from the point X to the point m and then at the second rotational speed Vs from the point m to the reference position, the required time for the movement will be $(X-m)/V_f+m/V_s$ (2). Accordingly, the time difference between the above two cases will be $(1)-(2)=(X-m)(V_f-V_s)/V_s \times V_f$. As understood from this calculation, it is obvious that the time required for moving (rotating) the output shaft 26 to its reference position will become shorter, when the first rotational speed $V_f$ is made higher than the second rotational speed $V_s$. And the larger the distance of the output shaft 26 from the reference position is, the bigger the time difference is. When the first rotational speed $V_f$ is made faster than the second rotational speed $V_s$, the larger time reduction effect can be obtained.

Now an operation for controlling the direction of the optical axis of the headlights 6 will be explained.

The control unit 5 outputs a control signal to the stepping motor 18 to initialize the position of the output shaft 26, before the direction of the optical axis of the headlights 6 will be controlled in response to a steering movement of the steering wheel 3 of the motor vehicle 2.

When the stepping motor 18 receives the control signal from the control unit 5, the rotational shaft 21 is rotated. Then the driving gear 14 is rotated together with the shaft 21, and the first and second intermediate gears 15 and 16 are rotated. And the second intermediate gear 16 is rotated (in the reverse direction) until the limiter 34 formed in the second gear 16 will impinge against the stopper 27.

Since the output gear 17 is engaged with the small gear 32 of the second intermediate gear 16, the output shaft 26 and the headlight 6 operatively connected to the output shaft 26 are moved in accordance with the rotation of the second intermediate gear 16. When the limiter 34 impinges against the stopper 27, the output shaft 26 will be then rotated in the forward direction by a predetermined angle and stops at a position which will be the reference position. This reference position is in advance memorized in the control unit 5.

After the initialization of the output shaft 26 has been completed, the control unit 5 outputs a pulse signal to the stepping motor 18 to rotate the output shaft 26 by a desired angle from its reference position and finally to move the headlights 6 to the desired direction. As above, the control unit 5 outputs the pulse signal to the actuator 7 in proportion to the steering angle of the steering wheel 3 to change the direction of irradiation of the headlights 6 in correspondence with the change of the direction of the motor vehicle 2.

Figure 7:
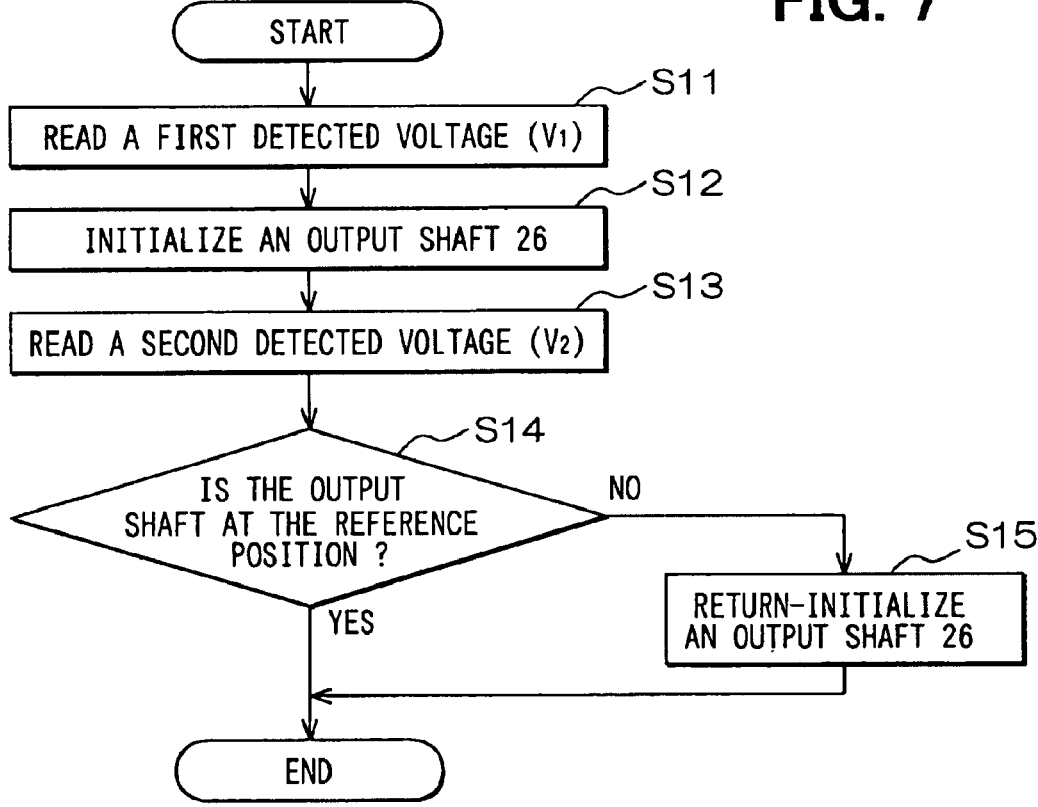
FIG. 7 is a flowchart showing an operation of the rotational driving apparatus.
Figure 10:
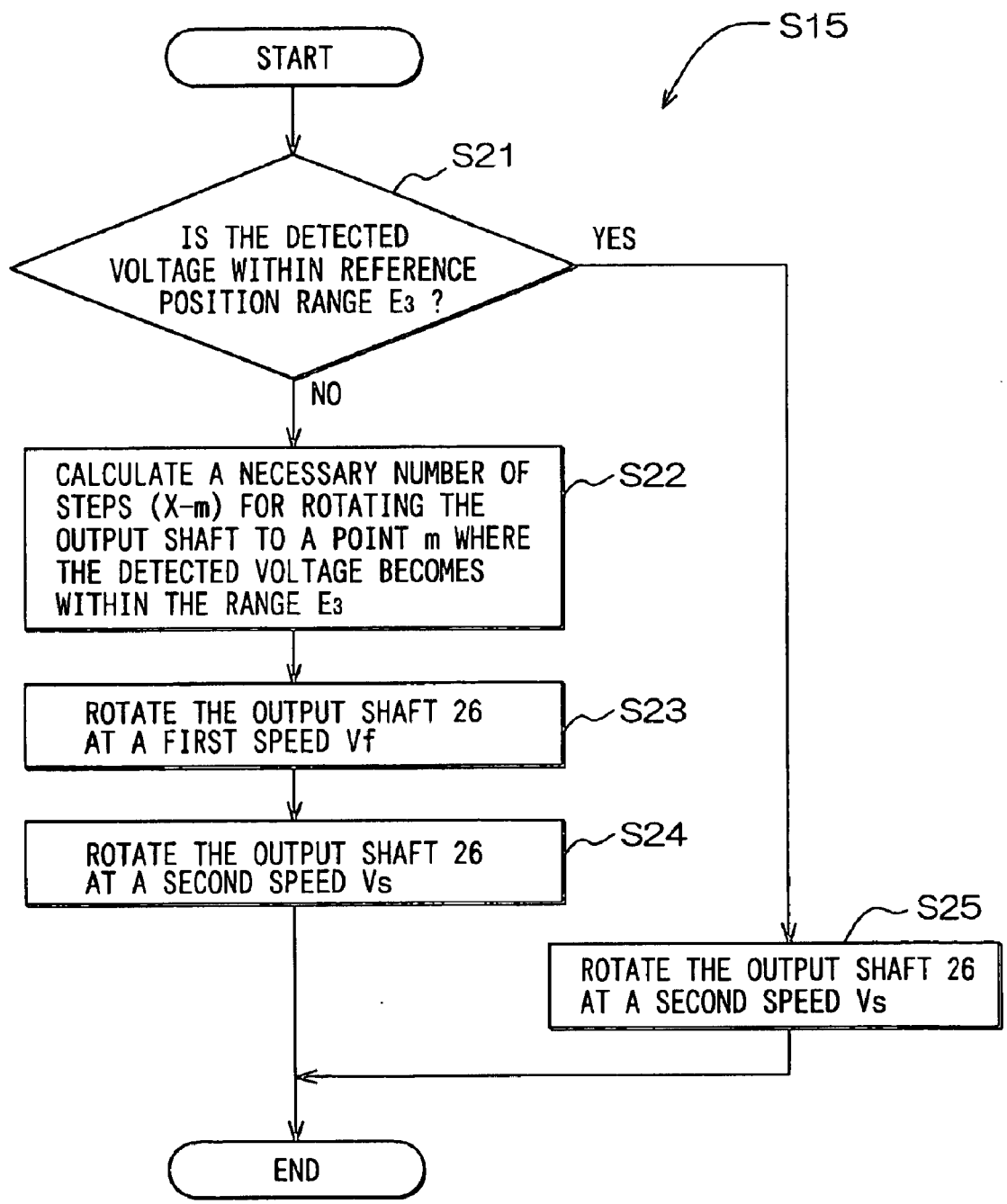
FIG. 10 is a flow chart showing an operation of the rotational driving apparatus.

The operation of the control unit 5 will be further explained with reference to FIGS. 6, 7 and 10. At first, a process for determining that the operation of the output shaft 26 is in a good order will be explained. The process will be explained for a case in which the output shaft 26 will be moved from the reference position to a point n which corresponds to the number of steps n, wherein the first detection position is the reference position and the second detection position is the point n.

Figure 6:
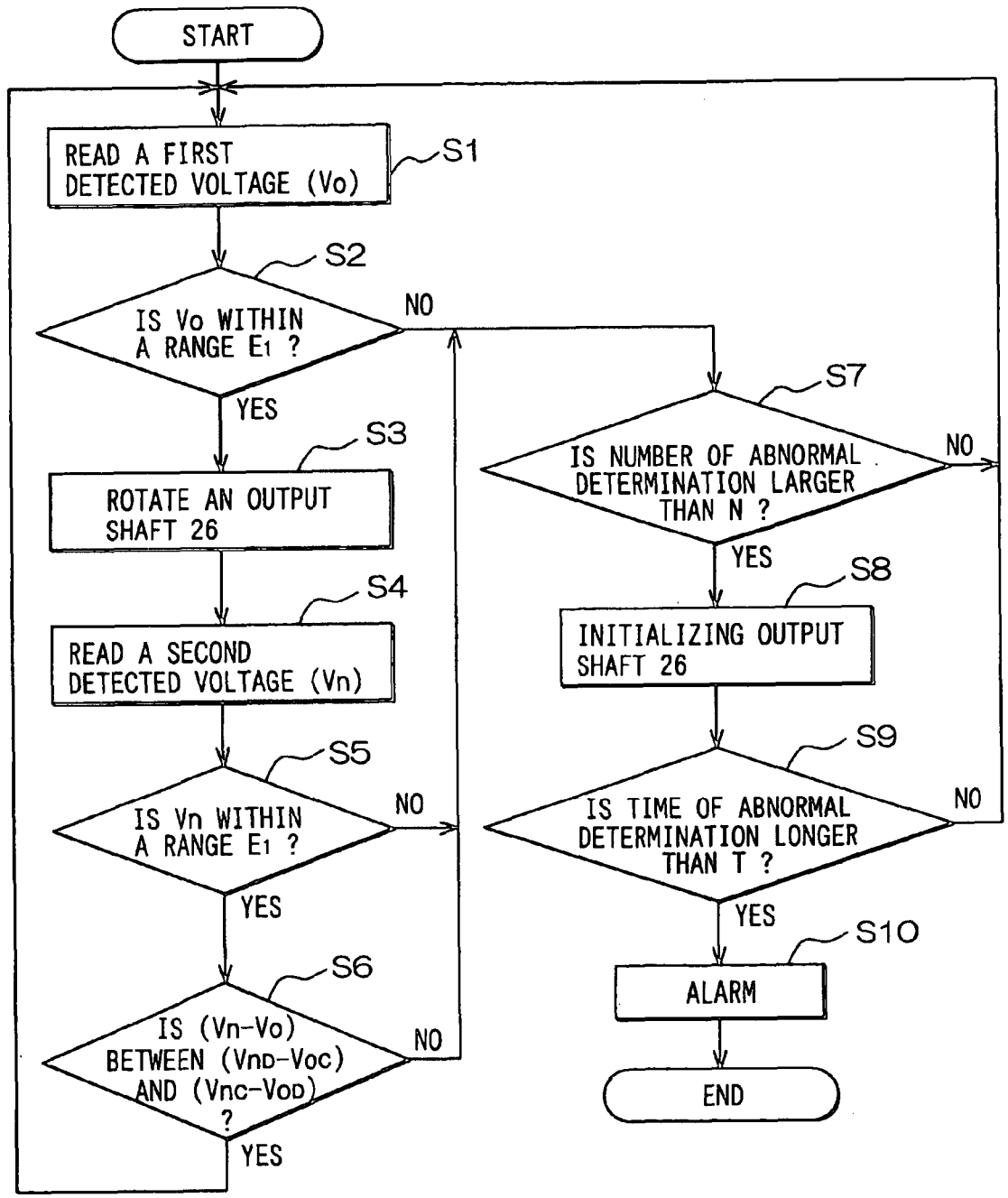
FIG. 6 is a flow chart showing an operation of the rotational driving apparatus.

At a step S1 of FIG. 6, the first detected voltage $V_o$ is read in from the magnetic sensor 38 and it is determined at a step S2 whether the first detected voltage $V_o$ is within the first error range $E_1$ at the first detection position, which is a point where a number of steps is zero. Namely, it is determined at the step S2 whether the first detected voltage $V_o$ is between the voltage $V_{OB}$ and the voltage $V_{OA}$ (FIG. 8). In case that the first detected voltage is within the first error range $E_1$ (YES; at step S2), the process goes to a step S3, where the headlights 6 will be moved by the operation of the control unit 5 in accordance with the steering signal from the angle sensor 4.

At a step S4, the second detected voltage $V_N$ is read in from the magnetic sensor 38 and read out from the RAM 5 a number of steps of the output shaft 26 which corresponds to the second detected voltage $V_N$. Then it is determined at a step S5 whether the second detected voltage $V_N$ is within the first error range $E_1$ at the second detection position, which is a point where a number of steps is n. Namely, it is determined at the step S5 whether the second detected voltage $V_N$ is between the voltage $V_{NB}$ and the voltage $V_{NA}$ (FIG. 8). In case that the second detected voltage is within the first error range $E_1$ (YES; at step S5), the process goes to a step S6.

At the step S6, it is determined whether the output shaft 26 has been rotated without causing an immovable condition or a lost motion. Namely, it is determined whether the deferential voltage ($V_N-V_O$) between the first and second detected voltages is within a span of a first deferential voltage ($V_{ND}-V_{OC}$) and a second deferential voltage ($V_{NC}-V_{OD}$). The first deferential voltage ($V_{ND}-V_{OC}$) is a deferential voltage between the maximum value of the second error range $E_2$ at the reference position (the first detection position) and the minimum value of the second error range $E_2$ at the point n (the second detection position) to which the output shaft 26 has been rotated, whereas the second deferential voltage ($V_{NC}-V_{OD}$) is a deferential voltage between the minimum value of the second error range $E_2$ at the reference position and the maximum value of the second error range $E_2$ at the point n.

When it is determined at the step S6 (YES; at step S6) that the deferential voltage ($V_N-V_O$) is within the span between the first deferential voltage ($V_{ND}-V_{OC}$) and the second deferential voltage ($V_{NC}-V_{OD}$), the process will terminates and goes back to the step S1.

In the above operation, the process goes to a step S7, when the first detected voltage $V_O$ is not within the first error range $E_1$ (NO; at step S2), when the second detected voltage $V_N$ is not within the first error range $E_1$ (NO; at step 5), or when the deferential voltage ($V_n$-$V_O$) is not within the span between the first deferential voltage ($V_{ND}$-$V_{OC}$) and the second deferential voltage ($V_{NC}$-$V_{OD}$) (NO; at step S6).

At the step S7, it is determined whether a total number of abnormal determinations at the steps S2, S5 and S6 is larger than a number N, wherein when the total number is larger than N (YES; at step S7), then the process goes to a step S8. At the step S8, the operation of the stepping motor 18 is stopped and a control signal for initializing the output shaft 26 is transmitted to the stepping motor 18.

At a step S9, it is determined whether a time period for the abnormal determination of the output shaft 26 is over a predetermined time T, and if YES at this step S9 then the process goes to a step S10.

At the step S10, it is determined that the rotational driving apparatus is not in a good operational order and the control unit 5 gives an alarm to a driver by an alarm lamp or the like that the rotational driving apparatus is out of order. And the process terminates after this warning.

The process goes back to the step S1, when the total number is less than N (NO; at step S7), or the time period for the abnormal determination is shorter than the predetermined time T (NO; at step S9.

As explained above, the control signal for initializing the output shaft 26 is applied to the stepping motor 18 at the step S8 in FIG. 6. The initializing operation will now be explained with reference to FIG. 7. In this initialization operation, the output shaft 26 is rotated at first in the reverse direction and then rotated in the forward direction by a predetermined amount after the limiter 34 impinges against the stopper 27. And the position of the output shaft so rotated above is regarded as the reference position.

At the step 11, a first detected voltage $V_1$ is read in and the initialization of the output shaft 26 will be done at a step S12. In this initialization process of the present embodiment, the output shaft 26 is at first rotated in the reverse direction by 20 steps and then rotated in the forward direction by 8 steps (FIG. 8). At a step S13, a second detected voltage $V_2$ is read in. In this embodiment, a rotational angle between the point where the limiter 34 impinges against the stopper 27 and the reference position is set to correspond to the 8 steps, and the third error range is set to be smaller than the maximum value of the deferential voltage corresponding to 6 steps.

At a step S14, the initialization operation for the output shaft 26 is confirmed, namely it is determined whether the output shaft 26 is positioned at the reference position. More exactly, the deferential voltage ($|V_1$-$V_2|$) between the first and second detected voltages is within the third error range. When it is determined that this deferential voltage ($|V_1$-$V_2|$) is within the third error range (YES; at step S14), the process terminates.

When it is determined at the step S14 that this deferential voltage ($|V_1$-$V_2|$) is not within the third error range (No; at step S14), the process goes to a step S15 for proceeding with a return initializing process. The operation of the return initializing process will be explained with reference to FIGS. 9 and 10.

At a step S21, it is determined whether the detected voltage ($V_X$) is within the reference position range $E_3$. This determination is made by comparing the step number X and the step number m, wherein the step number X is derived from the detected voltage ($V_X$) and the step number m can be derived from the line $L_B$. And it is determined that the detected voltage ($V_X$) is not within the reference position range $E_3$, when the step number X is larger than the step number m.

When it is the case, the control unit 5 calculates a necessary number of stepping pulses (X-m) at a step S22 and drives the stepping motor 18 by the number of stepping pulses (X-m) to rotate the output shaft 26 in the reverse direction at a first rotational speed $V_f$ at a step S23. As a result, the output shaft is rotated to move from the position X to the position m. After the detected voltage has become within the reference position range $E_3$, namely after the output shaft 26 reaches at the position m, the output shaft 26 will be further rotated in the reverse direction by the number of steps m at a second rotational speed $V_s$ at a step S24.

When it is determined that the detected voltage ($V_X$) is within the reference position range $E_3$ at the step S21 (YES; at step S21), the process goes to a step S25, at which the output shaft 26 is rotated in the reverse direction at the second rotational speed $V_s$, as in the same manner at the step S24.

When the output shaft 26 is rotated at the step S24 or S25, the limiter 34 impinges against the stopper 27 as already explained, and thereafter the output shaft 26 is rotated in the forward direction by the amount corresponding to 8 steps, so that the output shaft 26 will be positioned at its reference position. As above, the return initializing process is terminated.

As explained above, the following effects can be obtained according to the embodiment of the present invention.

(1) It is surely detected that the output shaft 26 is operating in the good order while accepting possible errors inevitably caused at the output shaft 26. This is achieved by the following processes: At first, it is detected whether the first and second detected voltages at the respective first and second detection positions are within the first error range $E_1$. Secondly, it is determined that the deferential voltage between the first and second detected voltages is within the second error range $E_2$. Since the stepping motor 18 is used here as a driving means, and thereby the detected voltages from the magnetic sensor 38 become stable due to a detent force of the stepping motor, the operating condition of the output shaft 26 can be more surely detected.

(2) It can be determined that the output shaft 26 is operating within the second error range $E_2$. This is because the deferential voltage span is between the first and second deferential voltage ranges, wherein the first deferential voltage range is from the maximum value of the second error range at the first detection position to the minimum value of the second error range at the second detection position, whereas the second deferential voltage range is from the minimum value of the second error range at the first detection position to the maximum value of the second error range at the second detection position.

(3) The second error range $E_2$ is made to be narrower than the first error range $E_1$ and those errors to be caused in relation to the rotation of the output shaft 26 can be taken into consideration. As a result, the tolerance for the detected voltages of the output shaft 26 can be exactly selected and thereby a rotational range which can be detected by the control unit can be made larger.

(4) According to the embodiment, the control unit 5 determines whether the output shaft 26 is positioned at its reference position, wherein the initial position of the output shaft 26 before the rotation is selected as the first detection position, the position of the output shaft 26 after the rotation is selected as the second detection position, and the deferential voltage is determined whether it is within the third error range. When the third error range is selected to be such a range covering errors to be caused at a time in which the limiter 34 impinges against the stopper 27, it can be detected that the output shaft 26 is positioned at its reference position, while accepting the errors which may happen to appear at the initialization operation.

(5) In the case that the output shaft 26 is determined that it is not positioned at its reference position, the control unit 5 rotates the output shaft 26 in the reverse direction until the limiter 34 impinges against the stopper 27 and then rotates in the forward direction. Accordingly, the output shaft 26 will be positioned at its reference position.

(6) In the case that the output shaft 26 will be rotated in the reverse direction, the necessary number of steps for the stepping motor 18 is calculated by the control unit 5 in accordance with the relation between the minimum value of the error range and the number of steps corresponding the position of the output shaft, so that the output shaft 26 is rotated in the reverse direction by the steps calculated above. As above, the output shaft 26 will be surely rotated in the reverse direction until the position where the limiter 34 impinges against the stopper 27 and furthermore the output shaft is rotated by the minimum number of steps, to avoid a useless rotation of the output shaft 26.

(7) The output shaft 26 is urged by the torsion spring in the backward direction, so that the output shaft 26 is more exactly held and errors to be caused at the output shaft 26 can be suppressed. It is more effective when the rotational driving apparatus 1 is subject to the vibration.

(8) The rotational speed for the output shaft 26 is reduced through the first and second intermediate gears 15 and 16, so that errors for assembling will be absorbed.

(9) The headlights 6 are operatively connected to the output shaft 26, so that the optical axis of the headlights 6 will be controlled by the rotational driving apparatus 1 in response the steering angle of the steering wheel 3.

(10) In the case that the detected voltage is out of the reference position range $E_3$, and the output shaft 26 is initially positioned at a point far from the reference position, the output shaft 26 will be rotated at a relatively higher first speed $V_f$ so that the time for the rotation to the reference position can be reduced. When the detected voltage of the output shaft 26 will become within the reference position range $E_3$, namely the output shaft will be moved to a position close to the reference position, the output shaft 26 will be rotated at a second speed $V_s$ slower than the first speed $V_f$. As a result, the errors to be caused by the bounds which may happen to take place when the limiter 34 impinges against the stopper 27 will be minimized.

(11) In the case that the detected voltage is out of the reference position range $E_3$, and the output shaft 26 is initially positioned at the point far from the reference position, the output shaft 26 will be rotated at a relatively higher first speed $V_f$ so that the torque for rotating the stepping motor can be reduced. Furthermore, since the control unit 5 will increase the electric current and voltage to be applied to the stepping motor 18 in proportion to the increase of the rotational speed, a stepping out of the motor 18 will be avoided in addition to the reduction of the torque.

The above described embodiment can be modified in various manners. For example, the supply of the electric power to the actuator 7 can be done directly from the battery, instead of through the control unit 5.

In the above embodiment, the first detection position is the reference position and the second detection position is the position after the output shaft 26 has been rotated by the predetermined rotational range. However, the second detection position can be a position which is a maximum rotational position within a rotation control range for the output shaft 26. In the embodiment, the maximum rotational angle of the right-hand headlight 6 of the motor vehicle 2 is 15 degrees, which corresponds to 152 steps, whereas the maximum rotational angle of the left-hand headlight 6 is 5 degrees corresponding to 52 steps. When the second detection positions are respectively selected as the maximum rotational positions of 152 and 52 steps from the reference position, the output shaft 26 is stably held and the output voltages from the magnetic sensor 38 become more stable, so that determination of the output shaft 26 whether it is operating in the good order can be more surely done.

The relationship between the detected voltage from the magnetic sensor 38 and the corresponding number of steps for the output shaft 26 is not limited to that shown in FIG. 8.

In the above embodiment, the first detection position is the reference position and the second detection position is the position after the output shaft 26 has been rotated by the predetermined rotational range. However, the first detection position can be a position to which the output shaft is rotated by a predetermined number of pulses from the reference position.

In the above embodiment, the output shaft 26 is rotated in the reverse direction at the speed $V_f$ until the detected voltage of the output shaft 26 becomes within the reference position range $E_3$. However, the rotational range of the output shaft 26 in the reverse direction can be decided by other manners. For example, a position sensor is provided so that the output shaft 26 will be rotated at the relatively high speed $V_f$ for a certain rotational angle, which is decided by the output signal from the position sensor but during which the limiter 34 will not impinge against the stopper 27. And then the output shaft 26 will be rotated at the second lower speed $V_s$.

In the above embodiment shown in FIG. 1, the control unit 5 receives a signal from the angle sensor 4 to control the direction of the optical axis of the headlights 6. It is, however, also possible to provide a speed sensor 8 as indicated by a dotted line in FIG. 1, and a signal of a vehicle speed can be input into the control unit 5, so that the control unit 5 controls not only the direction of the headlights 6 but a speed of the direction control in accordance with the signals for the steering wheel and the vehicle speed.

What is claimed is:

1. A rotational driving apparatus comprising:
   a stepping motor supported by a housing;
   an output shaft rotationally supported by the housing and driven by the stepping motor;
   a rotational position detecting sensor for outputting a detected voltage in response to a rotational position of the output shaft; and
   a position detecting means for detecting the rotational position of the output shaft in accordance with the detected voltage from the rotational position detecting sensor,
   wherein the position detecting means comprises;
   a means for determining that the output shaft is in a good operational order
   when a first detected voltage of the output shaft at its first detection position (Step=0) and a second detected voltage of the output shaft at its second detection position (Step=n), to which the output shaft has been rotated by the stepping motor by a predetermined number of control pulses, are respectively within a predetermined error range; and when a deferential voltage between the first and second detected voltages corresponding to the predetermined number of control pulses between the first and second detection positions is within a certain deferential voltage span.

2. A rotational driving apparatus according to claim 1, wherein the certain deferential voltage span means a span from a first deferential voltage to a second deferential voltage, wherein the first deferential voltage is a deferential voltage between the maximum value of a second error range at the first detection position (step: 0) and the minimum value of the second error range ($E_2$) at the second detection position (step:n), whereas the second deferential voltage is a deferential voltage between the minimum value of the second error range at the first detection position (step: 0) and the maximum value of the second error range at the second detection position (step:n).

3. A rotational driving apparatus according to claim 2, wherein the error ranges are error ranges covering errors possibly included the detected voltages, and the second error range is narrower than the first error range.

4. A rotational driving apparatus according to one of claims 1 to 3, wherein the first detection position is a reference position of the output shaft and the second detection position is a position which is a maximum position to which the output shaft can be rotated.

5. A rotational driving apparatus according to claim 1, further comprising:
a position initializing means for rotating the output shaft in a reverse direction until the output shaft impinges against a stopper and then rotating the same in a forward direction by a predetermined number of steps,
wherein the determining means detects, as the first detected voltage, the output voltage from the rotational position detecting sensor at an initial position of the output shaft before it will be rotated by the position initializing means,
the determining means further detects, as the second detected voltage, the output voltage from the rotational position detecting sensor at a position of the output shaft which has been rotated by the predetermined number of control pulses by the position initializing means, and
the determining means determines whether the output shaft is positioned at its reference position by determining the deferential voltage between the first and second detected voltages is within the certain deferential voltage span as a third error range.

6. A rotational driving apparatus according to claim 5, further comprises a return initializing means for rotating the output shaft in the reverse direction until the output shaft impinges against the stopper and then rotating the same in the forward direction until the output shaft comes to the reference position, when the determining means determines that the output shaft is not positioned at its reference position after the operation of the position initialing means.

7. A rotational driving apparatus according to claim 6, wherein the return initializing means calculates
a number of steps representing the present position of the output shaft, and
a necessary number of stepping pulses for rotating the output shaft in the reverse direction from the present position to such a position where the output shaft impinges against the stopper means,
based on the detected voltage from rotational position detecting sensor and a predetermined formula between a number of steps and a minimum value of the error range for the detected voltages.

8. A rotational driving apparatus according to claim 7, wherein
the return initializing means calculates a necessary number of stepping pulses for rotating the output shaft in the reverse direction from the present position to such a position where the output shaft becomes within the reference position error range,
the return initializing means drives the output shaft to rotate the same by such number of stepping pulses at a first rotational speed, and then to rotate the output shaft at a second rotational speed slower than the first rotational speed.

9. A rotational driving apparatus according to claim 8, wherein
the return initializing means increases amounts of electric current and electric voltage to be applied to the stepping motor by a predetermined values, when the output shaft will be rotated in the reverse direction at the first rotational speed.

10. A rotational driving apparatus according to claim 1, wherein the output shaft is operatively connected to the stepping motor through a multistage speed reduction gear mechanism.

11. A rotational driving apparatus according to claim 1, further comprising a spring means for urging the output shaft in one rotational direction.

12. A rotational driving apparatus according to claim 1, wherein the rotational driving apparatus is connected to a steering angle sensor for a steering wheel of a motor vehicle so that a steering control signal is transmitted from the steering angle sensor to the rotational driving apparatus, and
wherein the output shaft of the rotational driving apparatus is operatively connected to headlights of the motor vehicle so that an optical axis of the headlights will be moved in response to a steering angle of the steering wheel.

* * * * *